United States Patent
Li et al.

(10) Patent No.: US 11,212,056 B2
(45) Date of Patent: Dec. 28, 2021

(54) DATA TRANSMISSION METHOD AND APPARATUS

(71) Applicant: ZTE CORPORATION, Shenzhen (CN)

(72) Inventors: Xincai Li, Shenzhen (CN); Yajun Zhao, Shenzhen (CN); Hanqing Xu, Shenzhen (CN); Ling Yang, Shenzhen (CN)

(73) Assignee: XI'AN ZHONGXING NEW SOFTWARE CO., LTD, Shaanxi (CN)

( * ) Notice: Subject to any disclaimer, the term of this patent is extended or adjusted under 35 U.S.C. 154(b) by 72 days.

(21) Appl. No.: 16/623,078

(22) PCT Filed: Jun. 15, 2018

(86) PCT No.: PCT/CN2018/091582
§ 371 (c)(1),
(2) Date: Dec. 16, 2019

(87) PCT Pub. No.: WO2018/228550
PCT Pub. Date: Dec. 20, 2018

(65) Prior Publication Data
US 2020/0186315 A1  Jun. 11, 2020

(30) Foreign Application Priority Data

Jun. 16, 2017 (CN) .......................... 201710459682.6

(51) Int. Cl.
*H04L 5/00* (2006.01)
*H04W 76/27* (2018.01)
(Continued)

(52) U.S. Cl.
CPC .......... *H04L 5/0053* (2013.01); *H04L 1/1812* (2013.01); *H04L 5/001* (2013.01);
(Continued)

(58) Field of Classification Search
CPC ..... H04L 5/0053; H04L 1/1812; H04L 5/001; H04L 5/0094; H04L 5/0035; H04W 76/27;
(Continued)

(56) References Cited

U.S. PATENT DOCUMENTS

2013/0286991 A1* 10/2013 Yang ................. H04W 72/1268
370/329
2014/0192744 A1* 7/2014 Zhou ..................... H04B 7/0626
370/329
(Continued)

FOREIGN PATENT DOCUMENTS

CN         106788943 A      5/2017

OTHER PUBLICATIONS

Qualcomm Incorporated: Title: "NR-LTE Co-channel Coexistence Considerations", 3GPP TSG-RAN WG1 RAN1 NR BIS R1-1705643, Date: Apr. 3-7, 2017 (Year: 2017).*

(Continued)

*Primary Examiner* — Lan-Huong Truong
(74) *Attorney, Agent, or Firm* — Bond Schoeneck & King, PLLC; George McGuire

(57) ABSTRACT

Provided are a data transmission method or apparatus. The method includes determining time domain resource information of different carrier signals used for performing data transmission; and sending configuration information to a UE, where the configuration information is used by the UE for determining the time domain resource information of the different carrier signals used for performing the data transmission.

15 Claims, 2 Drawing Sheets

Determine time domain resource information of different carrier signals used for performing data transmission in a manner of predefinition or coordination between base stations — S302

Send configuration information to a UE, where the configuration information is used by the UE for determining the time domain resource information of the different carrier signals used for performing the data transmission, and select, according to the time domain resource information, one carrier signal from the different carrier signals to perform the data transmission — S304

(51) Int. Cl.
- H04L 1/18 (2006.01)
- H04W 72/00 (2009.01)
- H04W 72/06 (2009.01)
- H04W 72/10 (2009.01)

(52) U.S. Cl.
CPC ......... *H04W 72/005* (2013.01); *H04W 72/06* (2013.01); *H04W 72/10* (2013.01); *H04W 76/27* (2018.02)

(58) Field of Classification Search
CPC ... H04W 72/005; H04W 72/06; H04W 72/10; H04W 72/042; H04W 72/0446; H04W 72/0486; H04W 72/0453
See application file for complete search history.

(56) References Cited

U.S. PATENT DOCUMENTS

| | | | | |
|---|---|---|---|---|
| 2015/0229453 | A1* | 8/2015 | Dai | H04W 72/0453 370/329 |
| 2017/0149543 | A1 | 5/2017 | Ang et al. | |
| 2018/0270838 | A1* | 9/2018 | Maheshwari | H04W 52/346 |

OTHER PUBLICATIONS

3GPP TSG RAN WG1 #85 R1-164020 Nanjing, China, May 23-27, 2016 (Year: 2016).*

AT&T: "Further Details and Techniques on LTE and NR Co-Existence", 3GPP draft; R1-1702281, vol. RAN WG1, No. Athens, Greece; Feb. 7, 2017, XP051221185, retrieved from the Internet: URL: http://www.3gpp.org/ftp/tsg_ran/WG1_RL1/TSGR1_88/Docs/ [retrieved on Feb. 7, 2017].

Samsung: "Co-existence of LTE and NR", 3GPP draft R1-164020, vol. RAN WG1, No. Nanjing, China; May 13, 2016, XP051096918, retrieved from the Internet: ULR:http://www.3gpp.org/ftp/tsg_ran/WG1_RL1/TSGR1_85/Docs/[retrieved on May 13, 2016].

Qualcomm Incorporated: "NR-LTE Co-channel Coexistence Considerations", 3GPP draft R1-1705643, vol. RAN WG1, No. Spokane; US Apr. 2, 2017, XP051243765, retrieved from the Internet: URL:http://www.3gpp.org/ftp/Meetings_3GPP_SYNC/RAN/Docs [retrieved on Apr. 2, 2017].

Huawei et al: "Considerations of NR UL operation for LTE-NR coexistence", 3GPP draft R1-1704199, vol. RAN WG1, No. Spokane, USA; Apr. 2, 2017, XP051242351, retrieved from the Internet: URL:http://www.3gpp.org/ftp/Meetings_3GPP_SYNC/RAN/Docs/ [retrieved on Apr. 2, 2017].

LG Electronics: "Discussion on multi-carrier operation between LTE and NR", 3GPP draft R1-1611783, vol. RAN WG1, No. Reno, USA; Nov. 5, 2016, XP051190149, retrieved from the Internet: URL:http://www.3gpp.org/ftp/tsg_ran/WG1_RL1/TSGR1_87/Docs/ [retrieved on Nov. 5, 2016].

European Search Report, dated Feb. 23, 2021, pp. 1-14.

International Search Report and Written Opinion Form PCT/ISA/210 and PCT/ISA/237, International Application No. PCT/CN2018/091582, pp. 1-5, International Filing Date Jun. 15, 2018 dated Aug. 30, 2018.

3GPP TSG/RAN WG1 RAN1 NR BIS R1-1705643 Apr. 3-7, 2017 Spokane, US Agenda item: 8.1.8 Source: Qualcomm Incorporated.

3GPP TSG RAN WG1 Meeting #89 R1-1706905 Hangzhou, China, May 15-19, 2017 Agenda Item: 7.1.8 Source: Huawei, HiSilicon.

3GPP TSG RAN WG1 Meeting #89 R1-1708062 Hangzhou, China, May 15-19, 2017 Agenda item: 7.1.8 Source: Samsung Title: LTE-NR Coexistence for UL.

* cited by examiner ically, the user equipment (UE) is

DATA TRANSMISSION METHOD AND APPARATUS

CROSS-REFERENCE TO RELATED APPLICATION

The present application is a national stage application under 35 U.S.C. 371 based on international patent application PCT/CN2018/091582, filed on Jun. 15, 2018 which claims the priority of Chinese patent application No. 201710459682.6 filed on Jun. 16, 2017 to the CNIPA, disclosures of both of which are incorporated in the present application by reference in their entireties.

TECHNICAL FIELD

The present disclosure relates to communications, for example, to a data transmission method and apparatus.

BACKGROUND

With the evolution of communication technologies, in 5G (5th generation) radio (New Radio, NR) access non-independent operation scenarios, one user equipment (UE) is capable of simultaneously connecting to two uplink carriers of the system, one is a long-term evolution (LTE) carrier, and another is an NR carrier. If the UE is capable of simultaneously sending uplink signals of two systems, two radio frequency chains (RF chain) are needed. Therefore, to reduce the cost of the UE, many UE equipment vendors suggest that the UE may have only one RF chain, and it is not mandatory for all UEs to support simultaneous uplink signal sending of the two systems, which will cause that at a certain moment, the UE can only send one uplink signal of an LTE and an NR. At present, when the UE configures or activates multiple carriers, i.e. in carrier aggregation (CA) or dual connectivity (DC) scenarios, the UE performs one or more uplink carriers sending according to the scheduling of the base station. In this case, data sending switch among different carriers is completely dependent on the scheduling of the base station to implement.

However, different base stations in the two systems are provided now. Therefore, the original method cannot solve the related problem.

Moreover, when the UE is simultaneously linked to two cells, and the two cells belong to different base stations, if two base stations simultaneously schedule the UE to perform the data transmission of the two carriers, an interference problem of intermodulation for N times may occur. Meanwhile, in a case where the uplink coverage of the UE is limited, limited by the maximum transmission power, if the terminal sends multiple signals at the same time, the coverage performance will be worse and a power sharing problem may also exist at the same time. Therefore, the existing art cannot solve the problem which occurs due to sending multiple carrier signals simultaneously.

SUMMARY

In a case of different base station in two systems, it is a simpler method to send a signal by using a concentrated power.

Therefore, how to determine or select one of signals of multiple carriers to perform data transmission is a problem to be solved.

Embodiments of the present application provides a data transmission method and apparatus to at least solve the problem of how to determine or select one of the signals of the multiple carriers to perform the data transmission in the existing art.

According to an embodiment of the present disclosure, a data transmission method is further provided. The method includes:

determining time domain resource information of different carrier signals used for performing data transmission; and selecting, according to the time domain resource information, one carrier signal from the different carrier signals on each time domain resource to perform the data transmission.

According to another embodiment of the present disclosure, a data transmission method is further provided. The method includes:

determining time domain resource information of different carrier signals used for performing data transmission in a manner of predefinition or coordination between base stations;

sending configuration information to a UE, where the configuration information is used by the UE for determining the time domain resource information of the different carrier signals used for performing the data transmission, and selecting, according to the time domain resource information, one carrier signal from the different carrier signals to perform the data transmission.

According to another embodiment of the present disclosure, a data transmission apparatus is further provided. The apparatus includes:

a determination module, which is configured to determine time domain resource information of different carrier signals used for performing data transmission; and a transmission module, which is configured to select, according to the time domain resource information, one carrier signal from the different carrier signals on each time domain resource to perform the data transmission.

According to another embodiment of the present disclosure, a data transmission apparatus is further provided. The apparatus includes:

a determination module, which is configured to determine time domain resource information of different carrier signals used for performing data transmission in a manner of predefinition or coordination between base stations;

a sending module, which is configured to send configuration information to a UE, where the configuration information is used by the UE for determining the time domain resource information of the different carrier signals used for performing the data transmission, and select, according to the time domain resource information, time domain resource information of one carrier signal from the different carrier signals to perform the data transmission.

According to another embodiment of the present application, a data transmission system is further provided. The system includes a terminal and a base station.

The base station determines time domain resource information of different carrier signals used for performing data transmission, and sends configuration information to the terminal in a manner of predefinition or coordination between base stations.

The terminal is configured to receive the configuration information, determine, according to the configuration information, the time domain resource information of the different carrier signals used for performing the data transmission; and select, according to the time domain resource information, one carrier signal from the different carrier signals on each time domain resource to perform the data transmission According to another embodiment of the present application, a storage medium is further provided. The storage medium includes stored programs which, when executed, execute the method of any one of the embodiments described above.

According to another embodiment of the present application, a processor is further provided. The processor is configured to execute programs which, when executed on the processor, execute the method of any one of the embodiments described above.

Through the present application, the time domain resource information of the different carrier signals used for performing the data transmission is determined in the manner of predefinition or coordination between the base stations, and the configuration information is sent to the UE. Where the configuration information is used for the UE to determine the time domain resource information of the different carrier signals used for performing the data transmission. Therefore, the problem of how to determine or select one of signals of the system carriers to perform the data transmission in the existing art is solved, poor system performance caused by transmission errors of two or more signals due to simultaneous transmission of the two or more signals is avoided, and latency of the data transmission is ensured at the same time and system performance is ensured.

DETAILED DESCRIPTION

It is to be noted that the terms "first", "second" and the like in the description, claims and drawings of the present application are used to distinguish between similar objects and are not necessarily used to describe a particular order or sequence.

Embodiment One

Figure 1:
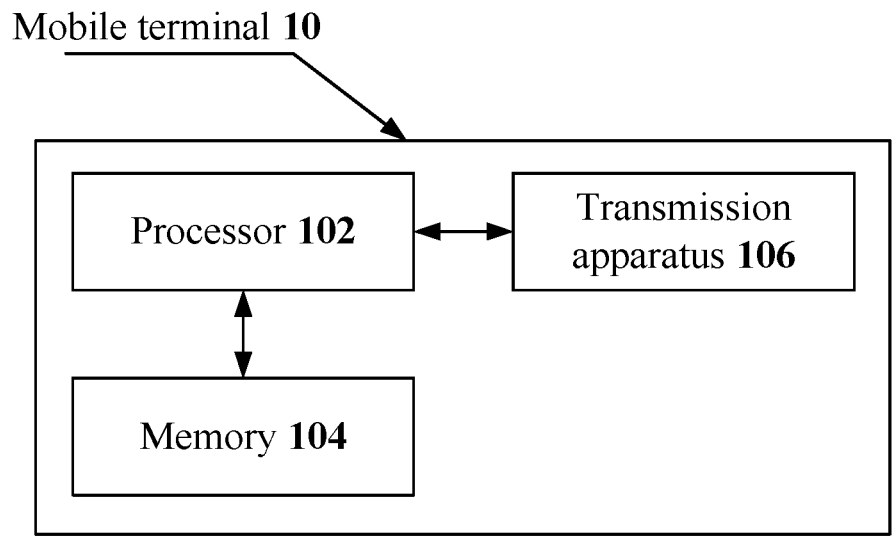
FIG. 1 is a block diagram of hardware of a mobile terminal of a data transmission method according to an embodiment of the present application.

A method embodiment provided by the embodiment 1 of the present application may be executed in a mobile terminal, a computer terminal or other similar computing apparatuses. Taking the method to be executed in the mobile terminal as an example, FIG. 1 is a block diagram illustrating a hardware structure of a mobile terminal for a data transmission method according to an embodiment of the present application. As shown in FIG. 1, a mobile terminal 10 may include one or two (only one is shown in FIG. 1) processors 102 (the processor 102 may include, but is not limited to, a processing device such as a micro computer unit (MCU) or a field-programmable gate array (FPGA)), a memory 104 configured to store data, and a transmission device 106 with a communication function. It should be understood by those skilled in the art that the structure shown in FIG. 1 is merely illustrative and not intended to limit the structure of the electronic apparatus described above. For example, the mobile terminal 10 may further include more or fewer components than the components shown in FIG. 1 or may have a configuration different from that shown in FIG. 1.

The memory 104 may be configured to store software programs and modules of application software, such as program instructions/modules corresponding to the data transmission method in the embodiments of the present application. The processors 102 execute the software programs and modules stored in the memory 104 to perform functional applications and data processing, that is, to implement the method described above. The memory 104 may include a high-speed random access memory, and may further include a nonvolatile memory such as one or two magnetic storage devices, flash memories or other nonvolatile solid-state memories. In some examples, the memory 104 may include memories which are remotely disposed with respect to the processor 102 and these remote memories may be connected to the mobile terminal 10 via a network. Examples of the above network include, but are not limited to, the Internet, an intranet, a local area network, a mobile communication network and a combination thereof.

The transmission apparatus 106 is configured to receive or transmit data via a network. Specific examples of such a network may include a radio network provided by a communication provider of the mobile terminal 10. In one embodiment, the transmission apparatus 106 includes a network interface controller, NIC, which may be connected to other network equipment via a base station and thus be capable of communicating with the Internet. In an example, the transmission apparatus 106 may be a Radio Frequency (RF) module, which is used for communicating with the Internet in a wireless way.

Figure 2:
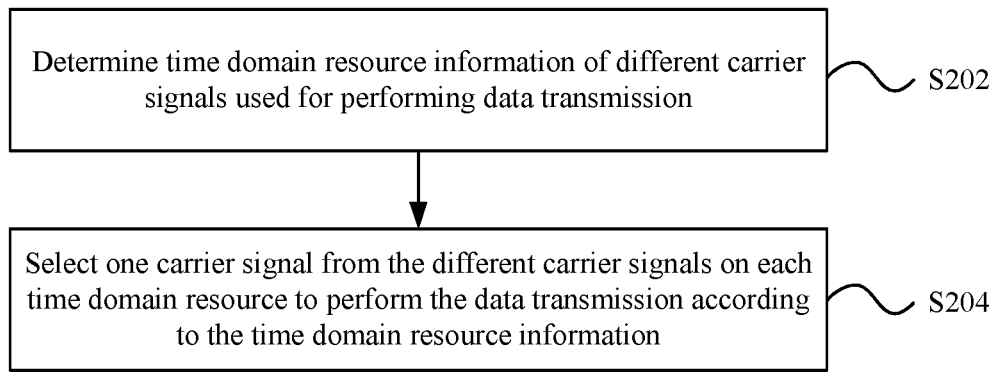
FIG. 2 is a flowchart of a data transmission method according to an embodiment of the present application.

This embodiment provides a data transmission method to be executed in the mobile terminal described above. FIG. 2 is a flowchart of a data transmission method according to embodiment one of the present disclosure. As shown in FIG. 2, the method includes steps described below.

In step 202, time domain resource information of different carrier signals used for performing data transmission is determined.

In step 204, one carrier signal is selected from the different carrier signals on each time domain resource to perform the data transmission according to the time domain resource information.

Through the above step, the time domain resource information of the different carrier signals used for performing the data transmission is determined. According to the time domain resource information, one carrier signal is selected from the different carrier signals on each time domain resource to perform the data transmission. Therefore, the problem of how to determine or select one of signals of multiple carriers to perform the data transmission in the existing art is solved, poor system performance caused by transmission errors of two signals due to simultaneous transmission of the two signals is avoided, and latency of the data transmission is ensured at the same time and system performance is ensured.

The time domain resource information of the different carrier signals used for performing the data transmission is determined.

According to the time domain resource information, one carrier signal is selected from the different carrier signals on each time domain resource to perform the data transmission.

In one embodiment, the step in which the time domain resource information of the different carrier signals used for performing the data transmission is determined includes:

determining the time domain resource information of different carrier signals used for performing data transmission through configuration information received from a base station, where the time domain resource information of the different carrier signals used for performing the data transmission is determined by the base station in a manner of predefinition or coordination between base stations.

In one embodiment, the step in which the time domain resource information of the different carrier signals used for performing the data transmission is determined includes at least one of: determining a time domain resource of the different carrier signals fixedly used for sending each carrier signal in the manner of predefinition or coordination between the base stations; determining the time domain resource information of the different carrier signals used for performing the data transmission according to priorities of sending the different carrier signals on the each time domain resource pre-defined or coordinated between the base stations; in response to determining that multiple carrier signals on one time domain resource need to send data at the same time, selecting one carrier signal on the time domain resource to perform the data transmission through a predetermined rule; determining the time domain resources of different carrier signals used for performing data transmission through downlink control information; or determining the time domain resource information of the different carrier signals used for performing the data transmission according to a usage type of the time domain resource pre-defined or coordinated between the base stations.

In one embodiment, determining the time domain resource of the different carrier signals fixedly used for sending each carrier signal in the manner of predefinition or coordination between the base stations; includes that: coordinated usage information of the time domain resource fixedly used for the each carrier signal is time domain resource pattern information fixedly used by the each carrier signal or partial pattern index information in a predefined pattern.

In one embodiment, according to the priorities of sending the different carrier signals on the each time domain resource pre-defined or coordinated between the base stations, determining the time domain resource information of the different carrier signals used for performing the data transmission includes one of:

determining the time domain resource information of the different carrier signals used for performing the data transmission through a manner of determining the priorities of sending the different carrier signals on the time domain resource according to load magnitudes or cached-data magnitudes of the different carrier signals;

determining the time domain resource information of the different carrier signals used for performing the data transmission through a manner of determining, according to transmission information on the time domain resource, the priorities of sending the different carrier signals on the time domain resource; or determining the time domain resource information of the different carrier signals used for performing the data transmission through a manner of determining, according to conditions of a primary serving cell (Pcell) and a secondary serving cell (Scell), the priorities of sending the different carrier signals on the time domain resource.

In one embodiment, selecting the one carrier signal to perform the data transmission on the time domain resource through the predetermined rule includes at least one of:

according to link states, path losses, radio resource management (RRM) measurement results, or coverage sizes of the different carrier signals, determining a carrier signal transmitted on the time domain resource;

according to load magnitudes or cached-data magnitude of the different carrier signals, determining a carrier signal transmitted on the time domain resource;

according to contents of data to be transmitted on the different carrier signals, determining a carrier signal transmitted on the time domain resource;

according to service types of the transmitted data, determining the carrier signal transmitted on a time domain resource; or according to attributes of the different carrier signals, determining a carrier signal transmitted on the time domain resource.

In one embodiment, in the step of determining the time domain resource information of the different carrier signals used for performing the data transmission according to the usage type of the time domain resource pre-defined or coordinated between the base stations, the usage type of the time domain resource pre-defined or coordinated between the base stations includes at least one of:

a first time domain resource: a first carrier signal having a high priority for performing data transmission;

a second time domain resource: a second carrier signal having a high priority for performing data transmission;

a third time domain resource: a flexible time domain resource, where a carrier signal is selected to perform data transmission through the predetermined rule on the flexible time domain resource;

a fourth time domain resource: a time domain resource fixedly used for sending the first carrier signal, or a fifth time domain resource: a time domain resource fixedly used for sending the second carrier signal.

In one embodiment, the first carrier signal is an LTE carrier signal, and the second carrier signal is an NR carrier signal.

In one embodiment, determining the time domain resource information of the different carrier signals used for performing the data transmission through the configuration information received from the base station includes:

determining the time domain resource information of the different carrier signals used for performing the data transmission through higher layer signaling or broadcast information issued from the base station, where the higher layer signaling includes: radio resource control (RRC) signaling, a system information block (SIB) or remaining minimum system information (RMSI).

In one embodiment, the step in which the time domain resource information of the different carrier signals used for performing the data transmission is determined includes: in response to determining that a subcarrier interval of a carrier signal in which control information for scheduling the data transmission is located is different from a subcarrier interval of a carrier signal for the data transmission, or that the subcarrier interval of the carrier signal for the data transmission is different from a subcarrier interval of a corresponding HARQ-ACK feedback corresponding carrier, performing a change of scale according to an instruction of a referenced timing subcarrier interval to determine positions of time domain resources of the different carrier signals used for performing the data transmission.

In one embodiment, the referenced timing subcarrier interval is one of:

a predefined value, a semi-statically configured value, a subcarrier interval of a carrier signal sending downlink scheduling information, the subcarrier interval of the carrier signal for the data transmission, or a subcarrier interval of a carrier signal indicated by downlink control information.

In one embodiment, the time domain resource includes one of:

a minimum slot, more than two minimum slots, one slot, more than two slots, one subframe, more than two subframes, one radio frame, more than two radio frames, one unfixed duration, or one fixed duration.

In one embodiment, the time domain resources of the different carrier signals used for performing the data transmission are different.

Embodiment Two

Figure 3:
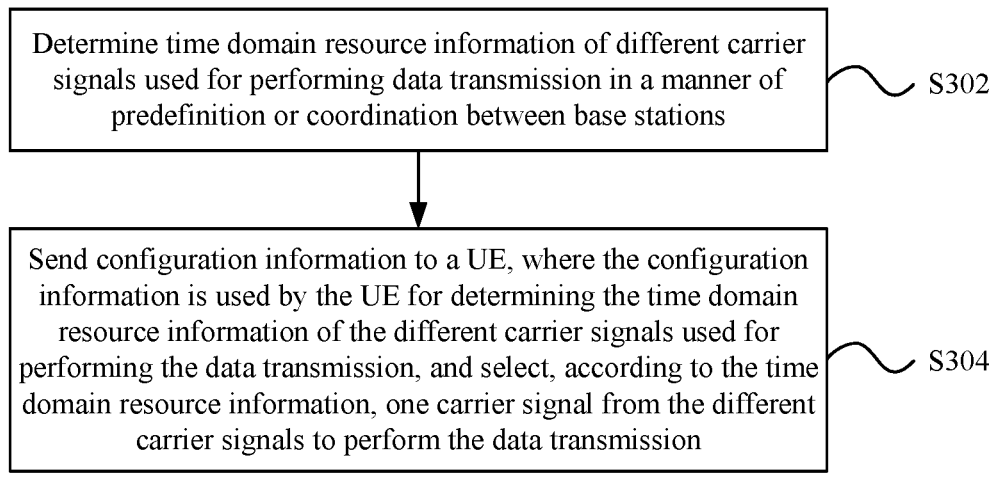
FIG. 3 is a flowchart of a data transmission method according to another embodiment of the present application.

According to another embodiment of the present disclosure, a data transmission method is provided. FIG. 3 is a flowchart two of the data transmission method according to an embodiment of the present disclosure. As shown in FIG. 3, the method includes the steps described below.

In step S302, time domain resource information of different carrier signals used for performing data transmission is determined in a manner of predefinition or coordination between base stations.

In step S304, configuration information is sent to a UE, where the configuration information is used by the UE for determining the time domain resource information of the different carrier signals used for performing the data transmission, and according to the time domain resource information, one carrier signal in the different carrier signals is selected to perform the data transmission.

Through the above step, the time domain resource information of the different carrier signals used for performing the data transmission is determined in the manner of predefinition or coordination between the base stations, and the configuration information is sent to the UE. Where the configuration information is used by the UE for determining the time domain resource information of the different carrier signals used for performing the data transmission, and according to the time domain resource information, one carrier signal in the different carrier signals is selected to perform the data transmission. Therefore, the problem of how to determine or select one of signals of multiple carriers to perform the data transmission in the existing art is solved, poor system performance caused by transmission errors of two signals due to simultaneous transmission of the two signals is avoided, and latency of the data transmission is ensured at the same time and system performance is ensured.

In one embodiment, the step in which the time domain resource information of the different carrier signals used for performing the data transmission is determined in the manner of predefinition or coordination between the base stations includes:

determining a time domain resource of the different carrier signals fixedly used for sending each carrier signal in the manner of predefinition or coordination between the base stations;

pre-defining, or coordinating between the base stations, priorities of sending the different carrier signals on each time domain resource;

indicating, by downlink control information, time domain resources of different carrier signals used for performing data transmission; and pre-defining, or coordinating between the base stations, a usage type of the time domain resources.

In one embodiment, determining the time domain resource of the different carrier signals fixedly used for sending each carrier signal in the manner of predefinition or coordination between the base stations, includes that:

coordinated usage information of the time domain resource fixedly used for the each carrier signal is time domain resource pattern information fixedly used by the each carrier signal or partial pattern index information in a predefined pattern.

In one embodiment, pre-defining, or coordinating between the base stations, the priorities of sending the different carrier signals on the each time domain resource includes one of:

determining the priorities of sending the different carrier signals on the time domain resource according to load magnitudes or cached-data magnitudes of the different carrier signals;

determining the priorities of sending the different carrier signals on the time domain resource according to transmission information on the time domain resource; or determining the priorities of sending the different carrier signals on the time domain resource according to a condition of a primary serving cell (Pcell) and a secondary serving cell (Scell)

In one embodiment, the usage type of the time domain resource pre-defined or coordinated between the base stations includes at least one of:

a first time domain resource: a first carrier signal having a high priority for performing data transmission;

a second time domain resource: a second carrier signal having a high priority for performing data transmission;

a third time domain resource: a flexible time domain resource, where a carrier signal is selected to perform data transmission sending through the predetermined rule on the flexible time domain resource;

a fourth time domain resource: a time domain resource fixedly used for sending the first carrier signal, or a fifth time domain resource: a time domain resource fixedly used for sending the second carrier signal.

In one embodiment, the first carrier signal is an LTE carrier signal, and the second carrier signal is an NR carrier signal.

In one embodiment, the method further includes:

in response to determining that a subcarrier interval of a carrier signal in which control information for scheduling the data transmission is located is different from a subcarrier interval of a carrier signal for the data transmission, or that the subcarrier interval of the carrier signal for the data transmission is different from a subcarrier interval of a corresponding HARQ-ACK feedback corresponding carrier, indicating a position of the time domain resource according to a referenced timing subcarrier interval.

In one embodiment, the time domain resource information includes one of:

a minimum slot, more than two minimum slots, one slot, more than two slots, one subframe, more than two subframes, one radio frame, more than two radio frames, one unfixed duration, or one fixed duration.

In one embodiment, the time domain resources of the different carrier signals used for performing the data transmission are different.

When the UE configures multiple uplink carriers and the multiple uplink carriers include an LTE carrier and an NR carrier, how does the capability-limited UE determine or select one of signals of the system carriers to perform the data transmission is described below.

In the case of NR cross-carrier scheduling, when a numerology of a carrier in which control information for scheduling the data transmission is located is different from a numerology of a carrier for the data transmission, or the numerology of the carrier for the data transmission is different from a numerology of a corresponding hybrid automatic repeat reQues acknowledgement (HARQ-ACK) feedback corresponding carrier, how to indicate a timing relationship between scheduling signaling and the data transmission and a timing relationship between the data transmission and the HARQ-ACK feedback is a problem. A data transmission method applied to a UE side of the embodiment of the present application includes: determining time domain resource information of different carrier signals used for performing data transmission.

In one embodiment, the time domain resource information includes a minimum slot or multiple minimum slots, one slot or multiple slots, one or more subframes, one or more radio frames, one unfixed duration, and one fixed duration.

In one embodiment, the time domain resources of the different system carrier signals used for performing the data transmission are different.

In one embodiment, the UE determines the time domain resource information of the different carrier signals used for performing the data transmission in a manner of predefinition or coordination between base stations.

Then a corresponding system carrier signal on the corresponding time domain resource is selected to perform the system carrier data transmission.

In one embodiment, the sent carrier data is carried through at least one of physical channels or signals: a physical uplink shared channel (PUSCH), a short-physical uplink shared channel (s-PUSCH), a sounding reference signal (SRS), a physical uplink control channel (PUCCH), a short-physical uplink control channel (s-PUCCH), and a physical random access channel (PRACH).

When an LTE signal and an NR signal need to be transmitted at the same time, how to handle the transmission problem that the capability-limited UE only supports one carrier signal is described below.

Manner 1: between different systems, a time-division multiplexed resource for sending each carrier is determined in a manner of predefinition or coordination between base stations.

For example, a period for handover may be predefined, and the UE performs handover and transmission of different signals between two carriers according to the predefined period.

Or a 5G base station gNB and a 4G base station eNB interact with each other and semi-statically coordinate time domain resource transmitted by each system.

Manner two: priorities of sending the different carrier signals on each time domain resource are predefined and coordinated between the base stations.

Figure 4:
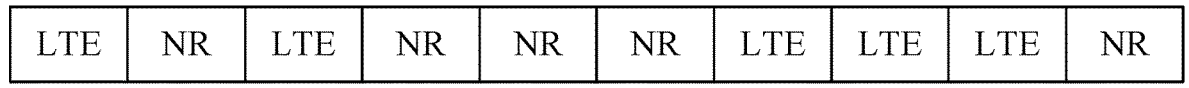
FIG. 4 is a schematic diagram of priorities of an LTE and an NR on each time domain resource according to an embodiment of the present application.

FIG. 4 is a schematic diagram of priorities of the LTE and the NR on each time domain resource according to the embodiment of the present disclosure. As shown in FIG. 4, the priorities of the LTE and the NR on each time domain resource are defined. For the system having a higher priority, if data needs to be sent on the time domain resource, and then the data transmission is directly performed on the resource. When no data needs to be sent on the system having the higher priority, the UE may also send carrier data having a lower priority in the time domain resource.

For example, a subframe/slot N pre-defines that the LTE priority is higher. If the UE simultaneously schedules the data of the LTE and the NR at the same time, the UE sends the LTE-PUSCH. If LTE data is not scheduled and only NR data is scheduled, the NR data may also be sent, which improves the resource utilization.

In one embodiment, the priority of the system signal sending on the time domain resource is determined by the following manners:

determining priority characteristics of systems on a certain time domain resource according to load magnitudes or cached-data magnitudes of the systems;

determining the priority characteristics of the systems on a certain time domain resource according to information transmitted by slots of the systems; or determining the priority characteristics of the systems on a certain time domain resource according to cases of primary serving cells (Pcell) and secondary serving cells (Scell) of the systems.

Manner three: when two systems need to send the data at the same time on a certain time domain resource, the UE selects a signal of one system to send, a selection rule is determined according to at least one of the following rules.

Rule one: the UE selects the signal according to link states, path losses, radio resource management (RRM) measurement results, or coverage sizes.

The UE first perform carrier measure on the NR, and it is based on a measurement result of the path loss. When a reference signal receiving power (RSRP) of a high-frequency NR carrier is measured to be greater than a predefined threshold, sending with a high-frequency carrier is selected. When the RSRP of the high-frequency NR carrier is measured to be less than the predefined threshold, a low-frequency LTE carrier is selected to perform the uplink data sending.

Rule two: a carrier signal transmitted on the time domain resource is determined according to the load magnitudes or the cached-data magnitudes.

Rule three: according to a content of data to be transmitted on the carrier, the carrier signal transmitted on the time domain resource is determined.

For example, a priority order of different predefined uplink channels or signals is as follow:

PRACH>PUCCH with SR>PUCCH/PUSCH with ACK/NACK>PUCCH/PUSCH with CSI>PUSCH without UCI.

Rule four: the carrier signal transmitted on the time domain resource is determined according to service types to be sent.

When low-latency service types and other service types need to be sent at the same time, the UE selects the low-latency service to send.

Rule five: the carrier signal transmitted on the time domain resource is determined according to a carrier attribute of the Scell, a primary cell of secondary carrier group (PSCell) or the Pcell, or a combination of the above elements. When it is determined that the priorities of the two systems are equal according to a certain rule, the priorities of system signals is determined finally in combination with other rules.

Manner four: downlink control information (DCI) indicates multiple candidate time domain positions for scheduling. If the UE does not send this time, where the data scheduled by the DCI indication is sent next time is given in the DCI.

Manner 5: the usage for the time domain resource pre-defined or coordinated between the base stations includes three types: a first time domain resource, a second time domain resource and a third time domain resource.

The first time domain resource: the LTE system carrier having a higher priority for performing the data transmission, or a time domain resource fixedly used for the LTE system carrier sending of.

The second time domain resource: the NR system carrier having a higher priority for performing the data transmission, or a time domain resource fixedly used for the NR system carrier sending.

The third time domain resource: a flexible time domain resource. The UE automatously selects the carrier for the data transmission on the time domain resource.

Figure 5:
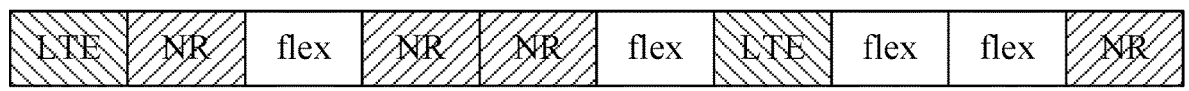
FIG. 5 is a schematic diagram of time domain resource signal sending in a certain period according to an embodiment of the present application.

FIG. 5 is a schematic diagram of time domain resource signal sending in a certain period according to an embodiment of the present application. As shown in FIG. 5, the time domain resource signal sending in a certain period is predefined or coordinated between the base stations. Some certain time units are for predefined data sending of LTE carrier and some certain time units are for predefined data sending of NR carrier. The remaining time units are flexible time units, and are for the UE automatously selecting to perform sending of the LTE carrier and the NR carrier.

In one embodiment, semi-static coordination information between the base stations is transmitted through backhaul signaling, such as an x2 interface.

The base station then notifies the UE through radio resource control (RRC) signaling, a system information block (SIB) or remaining minimum system information (RMSI), and then the UE selects a corresponding system carrier signal on a corresponding time domain resource according to the information to perform the uplink data transmission.

When the NR carrier performs the data transmission, a carrier in which scheduling signaling is located is not uniform with the carrier for the data transmission, i.e., the problem of determining a scheduling timing and a feedback timing when cross-carrier scheduling is used. A referenced timing numerology is defined. The numerology may be a predefined value or a semi-configured value, such as 15 KHz, 30 KHz, a numerology of a carrier predefined to send downlink scheduling information, a numerology of a carrier for performing the data transmission or a numerology of a designated carrier.

The indicated timing performs indication according to the referenced numerology or the carrier, and other carriers perform a conversion according to a predefined scale relationship.

Through the embodiment of the present disclosure, the problem that how does capability-limited UE determine or select one of the signals of the two system carriers on a certain time domain resource to perform the data transmission is solved, the poor system performance caused by transmission errors of two signals due to simultaneous transmission of the two signals is avoided, and latency of the data transmission is ensured at the same time and system performance is ensured.

Details of some processes are described hereinafter through specific application embodiments.

In an optional embodiment, for a case where the UE is connected to the LTE carrier and the NR carrier at the same time, how to determine to perform data transmission on the LTE carrier or perform data transmission on the NR carrier is described below.

In this case, the LTE data and the NR data may be sent in a manner of time division multiplexing (TDM). A specific TDM pattern is determined according to one of the following manners.

Manner one: the specific TDM pattern is determined in a predefined manner.

The predefinition further includes predefining a handover period and a TDM pattern.

For example, a handover period for data transmission of the carrier or system may be predefined. The predefined handover period may be 2 ms or 4 ms, and the UE performs the handover according to the predefined period between the two carriers.

Or some resources are predefined for the NR to use, some moments are predefined for the LTE to use, or the TDM pattern is predefined.

Manner two: the semi-static resource coordination may be performed between the base stations of two systems.

The gNB and the eNB may interact with each other on the time domain resource transmitted by semi-static coordination through backhaul signaling, such as an X2 interface.

The base station notifies the subordinate UE through RRC signaling or RMSI, and the UE determines, according to the information, whether to send an LTE signal or an NR signal at a moment k.

For example, the base station notifies that the time domain resource pattern of time-division multiplexing of the LTE and the NR is "LTE NR NR LTE LTE LTE NR NR LTE LTE NR" through signalling 10011100110.

In one embodiment, the uplink signal includes some uplink channels and signals of the LTE and the NR, such as an uplink scheduled PUSCH, an aperiodic SRS, an aperiodic and periodic UCI transmission, where the UCI includes a scheduling request, a channel state information (CSI) feedback, a precoding matrix indicator (PMI), a rank indication (RI) feedback, some information related to a beam, and a random access preamble.

In this manner, the base station performs data scheduling based on the time domain resource for the system data transmission, and does not schedule the data to the time domain resource that can be used by other systems, thus no additional waste of the scheduling signaling exists.

In another optional embodiment, for a case where the UE is connected to the LTE carrier and the NR carrier at the same time, another method for how to determine to perform data transmission on the LTE carrier or perform data transmission on the NR carrier is described below.

A method for pre-defining or coordinating priorities signal sending on each time domain resource between the base stations is as follows:

defining the priorities of an LTE and an NR at each moment. If at a certain moment, the UE needs to send LTE information and NR information at the same time, and then the UE performs carrier data transmission according to the predefined priorities of sending information.

The UE sends the carrier data having a higher priority.

In one embodiment, the priorities of the system signal sending on a certain time domain resource is determined by at least one of the following.

Priority characteristics of systems on a certain time domain resource are determined according to load magnitudes or cached-data magnitudes of the systems.

The priorities for the system performing the data transmission on a certain time domain resource may be determined according to previous calculated load magnitude information or cache magnitude information of each system.

The system with a higher load has a higher priority on the closest time domain resource.

The priority characteristics of systems are determined on a certain time domain resource according to information transmitted by slots of the systems.

For example, the priorities of various uplink channels are predefined as follows: PUCCH with SR>PUCCH/PUSCH with ACK/NACK>PUCCH/PUSCH with CSI>PUSCH without UCI.

Corresponding to at least one of UCI and PUSCH with a same priority, the priorities are PUCCH≥PUSCH with UCI>PUSCH without PUSCH.

At the same time, the priorities of UCI having different types are defined as follows: ACK>SR (starting at the next moment)>aperiodic CSI>periodic CSI>PUSCH without UCI.

The priority of the PRACH is higher than that of other all uplink types.

The priority characteristics of the systems on a certain time domain resource is determined according to conditions of the Pcell and the Scell of the system carriers.

In principle, PCell data transmission has a higher priority than SCell data transmission.

For example, when the LTE carrier is configured to be the PCell and the NR carrier is configured to be the SCell, the LTE carrier has a higher priority than the SCell.

Or the above factors may be combined together to determine the priorities of signal sending of a certain time domain resource.

In one embodiment, when an uplink load of the UE of the system is relatively small, the base station schedules uplink data on the time domain resource having a higher priority. For example, the LTE base station only schedules the uplink data of the UE on the time domain resource where the LTE system carrier having a higher priority.

When uplink load of the UE of the system is relatively large, the base station may also perform the uplink data scheduling by using the time domain resource having a lower priority.

In a manner of dividing the priorities of different systems sending data on a certain time domain resource, flexibility of data transmission is increased and latency of sending important information is reduced.

In another embodiment, for a case where the UE is connected to the LTE carrier and the NR carrier at the same time, and the two carriers both have data to be sent, another method for how to determine to perform data transmission on the LTE carrier or perform data transmission on the NR carrier is described below.

When the UE receives two pieces of downlink control information DCI at the same time, the downlink control information separately schedules two uplink signals to be transmitted simultaneously on two carriers, such as feedback of PUSCH, or aperiodic SRS or aperiodic uplink control information. The UE may select a carrier to perform the data transmission, and the selection rule includes at least one of the following rules.

Rule one: the UE selects the carrier according to link states, path losses, radio resource management (RRM) measurement results, or coverage sizes of the two carriers.

For example, the UE first perform carrier measures on the NR carrier, and it is based on a measurement result of the path loss. When a RSRP of a high-frequency NR carrier is measured to be higher than a predefined threshold, a high-frequency carrier is selected to send. When the RSRP of the high-frequency NR carrier is measured to be less than the predefined threshold, a low-frequency LTE carrier is selected to perform the uplink data transmission.

Rule two: the UE selects the carrier according to BSRs in each system.

For example, at a certain moment, after receiving signaling for scheduling the PUSCH, the UE determines the BSRs of the uplink data in the LTE and the NR systems of the UE. When the BSR of the LTE is greater than the BSR of the NR in the UE, the UE sends scheduling data of the LTE carrier. On the contrary, when the BSR of the LTE is smaller than the BSR of the NR of the UE, the UE sends the scheduling data of the NR carrier.

Rule three: the carrier for performing the data transmission is determined according to information contents or channel signals of data to be sent of different systems.

For example, the priorities of various uplink channels are predefined as follows:

PRACH>PUCCH with SR>PUCCH/PUSCH with ACK/NACK>PUCCH/PUSCH with CSI>PUSCH without UCI.

Rule four: the carrier for performing the data transmission is determined according to a service type to be sent.

The priority of a low-latency service type is higher than that of other service types. When a low-latency service type and other service types need to be sent at the same time, the UE selects the low-latency service to send.

Rule five: the carrier for performing the data transmission is determined according to a carrier attribute.

For example, the priority order may be performed according to an order of PCell>PScell>SCell. Especially when channels or signals sent by the two carriers are the same, the carrier for performing the data transmission may be determined according to the order.

In addition, the above rules may be used in combination. The UE combines various factors to determine whether the data transmission is performed by the LTE carrier or the NR carrier.

In this manner, if the base station does not receive the uplink data of the UE on the scheduled time domain resource, the base station may send position indication information of the time domain resource for the next data transmission. The time domain position is a time domain position having a high priority for the system carrier, to ensure that next transmission can be transmitted correctly and signaling overhead is reduced at the same time.

In another optional embodiment, for a case where the UE is connected to the LTE carrier and the NR carrier at the same time, a data transmission method is described below.

To reduce a latency for scheduling the data transmission, the following manners can be used when the data is scheduled.

Multiple candidate time domain positions for the transmission of scheduled uplink data or signal is indicated in downlink control scheduling information of the NR, such as N, N+2, and N+4. If the UE can only send data on the LTE carrier at the moment of N and scheduled data of the NR carrier cannot be sent at this time, the UE may send the scheduled data at the moment of N+2 according to subsequent and transmittable time domain position information indicated by DCI. If the carrier data of the LTE is still sent at the moment of N+2, then data of the NR carrier is sent at the moment of N+4. If the scheduled data also cannot be sent, the scheduled data can only be discarded.

In one embodiment, the time domain resource of the N, N+2 and N+4 may be one of: a time domain resource on which the NR has a higher priority, a time domain resource on which the NR has a lower priority, or a flexible time domain resource position.

In another embodiment, how does the UE determine to perform data transmission on the LTE carrier or perform data transmission on the NR carrier at a certain moment is described below.

The priorities of the data carrier on some time units in a certain configuration period are predefined or coordinated between the base stations, and then the remaining time units are flexible, the UE can automatously select a unit to send a certain carrier.

Some time units are predefined for data sending of the LTE carrier, and some time units are predefined for data sending of the NR carrier. The remaining time units are the flexible time units, and the UE automatously selects a unit to perform data sending of the LTE carrier and the NR carrier.

The predefined sending period is coordinated by the base station and is 0.125 ms, 0.25 ms, 0.5 ms, 1 ms, 5 ms or 10 ms.

Then the base station gNB and the base station eNB coordinate an attribute of each time domain resource in each period through backhaul signaling, and the time domain resource attribute included the following three types:

a first time domain resource: the LTE system carrier having a higher priority for performing the data transmission, or a time domain resource fixedly used for sending the LTE system carrier;

a second time domain resource: the NR system carrier having a higher priority for performing the data transmission, or a time domain resource fixedly used for sending the NR system carrier;

a third time domain resource: a flexible time domain resource. The UE automatously selects the carrier for the data transmission on the time domain resource.

The time domain resource includes a minimum slot or multiple minimum slots, one slot or multiple slots, one or more subframes, one or more radio frames, one unfixed duration, and one fixed duration.

A determination rule of the priorities of the time domain resource carriers is determined according to some principles in the embodiment two. The principle for the autonomous selection of the UE on the flexible time domain resources is performed according to the rules in the embodiment three.

The time domain resource fixedly used for a certain system carrier sending sends some information required a high reliability requirement, such as the PUCCH or the PUSCH carrying uplink control information, or the PRACH.

Through the method for determining the signal transmission of different system carriers on the time domain resource, the flexibility of data transmission may be improved, latency of the data transmission is reduced, and performance of both the LTE system and the NR system is ensured.

In another optional embodiment, for a case of different numerologies, in a scenario of cross-carrier scheduling, a method for determining an indication for scheduling and feeding back timing is described below.

A timing numerology for reference is defined. The numerology may be a predefined value, such as 15 KHz or 30 KHz, or the numerology is predefined to be a numerology of a carrier for sending downlink scheduling information, or a numerology of a carrier for performing the data transmission, or a numerology of a designated carrier. Then other numerologies are converted according to a corresponding scale.

The referenced timing numerology may also be semi-statically configured and then notified to the UE through an RRC message or a SIB or RMSI.

For example, the referenced timing numerology is predefined or semi-static configured to be 15 kHz, and then the base station sends the downlink control information to schedule the PUSCH/PDSCH at an n moment, and a numerology of a carrier in which the data transmission is located is scheduled to be 30 kHz, and a timing relationship indicated in the control information between control information and PUSCH/PDSCH is 8, a slot or a start slot in which the PUSCH/PDSCH transmission is located should be a position of a (n+4) slot.

The method for determining the timing indication is also applied to determination of the timing relationship when numerologies of carriers in which the data transmission and the corresponding HARQ-ACK are located are different.

The different numerologies correspond to different sub-carrier interval s and different time domain lengths.

From the description of the implementation modes above, it will be apparent to those skilled in the art that the method in the embodiments described above may be implemented by software plus a necessary general-purpose hardware platform, or may of course be implemented by hardware. However, in many cases, the former is a preferred implementation mode. Based on this understanding, the solution provided by the present application substantially, or the part contributing to the existing art, may be embodied in the form of a software product. The software product is stored on a storage medium (such as a ROM/RAM, a magnetic disk or an optical disk) and includes several instructions for enabling a terminal device (which may be a mobile phone, a computer, a server or a network device) to execute the method according to each embodiment of the present application.

Embodiment Three

A data transmission apparatus is further provided in this embodiment. The apparatus is used for implementing the above-mentioned embodiments and preferred implementation modes, and repetition will not be made about what has been described. As used below, the term "module" may be at least one of software, hardware or a combination thereof capable of implementing predetermined functions. The apparatus in the embodiments described below is preferably implemented by software, but implementation by hardware or by a combination of software and hardware is also possible and conceived.

Figure 6:
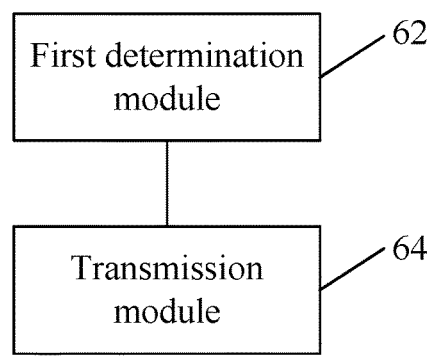
FIG. 6 is a block diagram of a data transmission apparatus according to an embodiment of the present application.

FIG. 6 is a block diagram of a data transmission apparatus according to an embodiment of the present application. As shown in FIG. 6, the apparatus includes a data transmission apparatus provided by another embodiment of the present application. The apparatus includes:

a first determination module 62, which is configured to determine time domain resource information of the different carrier signals used for performing the data transmission; and a transmission module 64, which is configured to select, according to the time domain resource information, one carrier signal from the different carrier signals on each time domain resource to perform the data transmission.

In one embodiment, the first determination module 62 is further configured to: determine the time domain resource information of different carrier signals used for performing data transmission through configuration information received from a base station, where the time domain resource information of the different carrier signals used for performing the data transmission is determined by the base station in a manner of predefinition or coordination between base stations.

In one embodiment, the first determination module 62 includes: a first determination unit, which is configured to determine a time domain resource of the different carrier signals fixedly used for sending each carrier signal in the manner of predefinition or coordination between the base stations;

a second determination unit, which is configured to determine the time domain resource information of the different carrier signals used for performing the data transmission according to priorities of sending the different carrier signals on the each time domain resource pre-defined or coordinated between the base stations;

a selection unit, which is configured to select, in response to determining that multiple carrier signals on one time domain resource need to send data at the same time, one carrier signal on the one time domain resource to perform the data transmission through a predetermined rule;

a fourth determination unit, which is configured to determine the time domain resources of the different carrier signals used for performing the data transmission through downlink control information;

a fifth determination unit, which is configured to determine the time domain resource information of the different carrier signals used for performing the data transmission according to a usage type of the time domain resource pre-defined or coordinated between the base stations.

In one embodiment, a content of coordinated usage information of the time domain resource fixedly used for sending the each carrier is time domain resource pattern information fixedly used by the each carrier signal or partial pattern index information in a predefined pattern.

In one embodiment, the second determination module is further configured to: determine the time domain resource information of the different carrier signals used for performing the data transmission through a manner of determining the priorities of sending the different carrier signals on the time domain resource according to load magnitudes or cached-data magnitudes of the different carrier signals; determine the time domain resource information used for performing the data transmission of the different carrier signals through a manner of determining, according to transmission information on the time domain resource, the priorities of sending the different carrier signals on the time domain resource; and determine the time domain resource information of the different carrier signals used for performing the data transmission through a manner of determining, according to conditions of a primary serving cell (Pcell) and a secondary serving cell (Scell), the priorities of sending the different carrier signals on the time domain resource.

In one embodiment, the predetermined rule includes at least one of:

determining, according to link states, path losses, radio resource management (RRM) measurement results, or coverage sizes of the different carrier signals, a carrier signal transmitted on the time domain resource;

determining, according to load magnitudes or cached-data magnitudes of the different carrier signals, a carrier signal transmitted on the time domain resource;

determining, according to contents of data to be transmitted on the different carrier signals, a carrier signal transmitted on the time domain resource;

determining, according to service types of the transmitted data, a carrier signal transmitted on the time domain resource; or determining, according to attributes of the different carrier signals, a carrier signal transmitted on the time domain resource.

In one embodiment, in the step of determining the time domain resource information of the different carrier signals used for performing the data transmission according to the usage of the time domain resource pre-defined or coordinated between the base stations, the usage type of the time domain resource pre-defined or coordinated between the base stations includes at least one of: a first time domain resource: a first carrier signal having a high priority for performing data sending; a second time domain resource: a second carrier signal having a high priority for performing data sending; a third time domain resource: a flexible time domain resource, where a carrier signal is automatously selected to perform data sending through the predetermined rule on the flexible time domain resource; a fourth time domain resource: a time domain resource fixedly used for sending the first carrier signal, or a fifth time domain resource: a time domain resource fixedly used for sending the second carrier signal.

In one embodiment, the first carrier signal is an LTE carrier signal, and the second carrier signal is an NR carrier signal.

In an embodiment, the determination unit is further configured to: determine the time domain resource information of the different carrier signals used for performing the data transmission through higher layer signaling or broadcast information issued from the base station, where the higher layer signaling includes: radio resource control (RRC) signaling, a system information block (SIB) or remaining minimum system information (RMSI).

In one embodiment, the first determination module 62 is further configured to:

in response to determining that a subcarrier interval of a carrier signal in which control information for scheduling the data transmission is located is different from a subcarrier interval of a carrier signal for the data transmission, or that the subcarrier interval of the carrier signal for the data transmission is different from a subcarrier interval of a corresponding HARQ-ACK feedback corresponding carrier, perform a change of scale according to an instruction of a referenced timing subcarrier interval to determine positions of time domain resources of the different carrier signals used for performing the data transmission.

In one embodiment, the referenced timing subcarrier interval is one of: a predefined value, a semi-statically configured value, a subcarrier interval of a carrier signal sending downlink scheduling information, the subcarrier interval of the carrier signal for the data transmission, or a subcarrier interval of a carrier signal indicated by downlink control information.

In one embodiment, the time domain resource includes one of: a minimum slot, more than two minimum slots, one slot, more than two slots, one subframe, more than two subframes, one radio frame, more than two radio frames, one unfixed duration, or one fixed duration.

In one embodiment, the time domain resources of the different carrier signals used for performing the data transmission are different.

Embodiment Four

Figure 7:
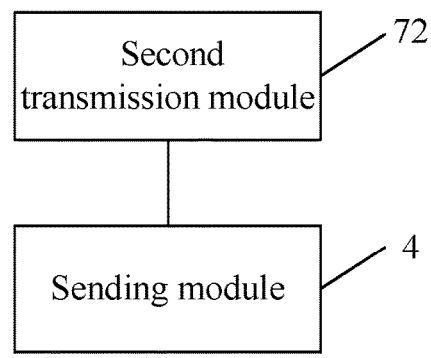
FIG. 7 is a block diagram of a data transmission apparatus according to another embodiment of the present application.

According to anther embodiment of the present disclosure, a data transmission apparatus is further provided. FIG. 7 is a block diagram of a data transmission apparatus according to another embodiment of the present embodiment. As shown in FIG. 7, the apparatus includes: a second determination module 72 and a sending module 74.

The second determination module 72 is configured to determine time domain resource information of different carrier signals used for performing data transmission in a manner of predefinition or coordination between base stations.

The sending module 74 is configured to send configuration information to a UE, where the configuration information is used by the UE for determining the time domain resource information of the different carrier signals used for performing the data transmission, and selecting time domain resource information of one carrier signal in the different carrier signals to perform the data transmission.

In one embodiment, the second determination module 72 includes a first determination submodule, a second determination submodule, a third determination submodule and a fourth determination submodule.

The first determination submodule is configured to determine a time domain resource of the different carrier signals fixedly used for sending each carrier signal in the manner of predefinition or coordination between the base stations.

The second determination submodule is configured to pre-define, or coordinate between the base stations, priorities of sending the different carrier signals on each time domain resource.

The third determination submodule is configured to indicate time domain resources of the different carrier signals used for performing the data transmission by downlink control information.

The fourth determination submodule is configured to pre-define, or coordinate between the base stations, a usage type of the time domain resource.

In one embodiment, the first determination submodule is further configured to: a content of coordinated usage information of the time domain resource fixedly used for sending the each carrier is time domain resource pattern information fixedly used by the each carrier signal or partial pattern index information in a predefined pattern.

In one embodiment, the second determination submodule is further configured to: determine priorities of sending the different carrier signals on the time domain resource according to load magnitudes or cached-data magnitudes of the different carrier signals;
determine the priorities of the different carrier signals on the time domain resource according to transmission information on the time domain resource; and
determine the priorities of sending the different carrier signals on the time domain resource according to a primary serving cell (Pcell) and a secondary serving cell (Scell).

In one embodiment, the fourth determination submodule is further configured that the usage type of the time domain resource pre-defined or coordinated between the base stations includes at least one of: a first time domain resource: a first carrier signal having a high priority for performing data sending; a second time domain resource: a second carrier signal having a high priority for performing the data transmission; a third time domain resource: a flexible time domain resource, where a carrier signal is selected to perform data sending through the predetermined rule on the flexible time domain resource; a fourth time domain resource: a time domain resource fixedly used for sending first carrier signal, or a fifth time domain resource: a time domain resource fixedly used for sending the second carrier signal.

In one embodiment, the first carrier signal is an LTE carrier signal, and the second carrier signal is an NR carrier signal.

In an embodiment, the apparatus further includes: an indication module, which is configured to in response to determining that a subcarrier interval of a carrier signal in which control information for scheduling the data transmission is located is different from a subcarrier interval of a carrier signal for the data transmission, or that the subcarrier interval of the carrier signal for the data transmission is different from a subcarrier interval of a corresponding HARQ-ACK feedback corresponding carrier, indicate a position of the time domain resource according to a referenced timing subcarrier interval.

In one embodiment, the time domain resource information includes one of: a minimum slot, more than two minimum slots, one slot, more than two slots, one subframe, more than two subframes, one radio frame, more than two radio frames, one unfixed duration, or one fixed duration.

In one embodiment, the time domain resources of the different carrier signals used for performing the data transmission are different.

According to another embodiment of the present application, a data transmission system is further provided. The system includes a terminal and a base station.

The base station determines time domain resource information of different carrier signals used for performing data transmission, and sends configuration information to the terminal in a manner of predefinition or coordination between base stations.

The terminal is configured to receive the configuration information, determine, according to the configuration information, the time domain resource information of the different carrier signals used for performing the data transmission; and select, according to the time domain resource information, one carrier signal from the different carrier signals on each time domain resource to perform the data transmission.

According to another embodiment of the present application, a storage medium is further provided. The storage medium includes stored programs which, when executed, execute the method, applied to the UE, of any one of the embodiments described above.

It needs to be noted that the various modules described above may be implemented by software or hardware. Implementation by hardware may, but may not necessarily, be performed in the following manners: the various modules described above are located in a same processor, or the various modules described above are located in their respective processors in any combination form.

Embodiment Five

An embodiment of the present disclosure further provides a storage medium. The storage medium includes a stored program which, when executed, executes any of methods described in the present disclosure.

In one embodiment, the storage medium may be configured to store program codes for executing: determining time domain resource information of the different carrier signals used for performing the data transmission; and selecting, according to the time domain resource information, one carrier signal from the different carrier signals on each time domain resource to perform the data transmission.

In another embodiment, the storage medium may be configured to store program codes for executing: determining time domain resource information of different carrier signals used for performing data transmission in a manner of predefinition or coordination between base stations; sending configuration information to a UE, where the configuration information is used by the UE for determining the time domain resource information of the different carrier signals used for performing the data transmission, and selecting, according to the time domain resource information, one carrier signal from the different carrier signals to perform the data transmission.

In the above embodiment, the storage medium may include, but is not limited to, a U disk, a read-only memory (ROM), a random access memory (RAM), a mobile hard disk, a magnetic disk, an optical disk or another medium capable of storing program codes.

Embodiment Six

An embodiment of the present application further provides a processor. The processor is configured to execute programs which, when executed on the processor, execute the method of any one of the embodiments described above.

In one embodiment, the programs are configured to execute: determining time domain resource information of the different carrier signals used for performing the data transmission; selecting, according to the time domain resource information, one carrier signal from the different carrier signals on each time domain resource to perform the data transmission.

In another embodiment, the programs are configured to execute: determining time domain resource information of different carrier signals used for performing data transmission in a manner of predefinition or coordination between base stations; sending configuration information to a UE, where the configuration information is used by the UE for determining the time domain resource information of the different carrier signals used for performing the data transmission, and selecting, according to the time domain resource information, one carrier signal from the different carrier signals to perform the data transmission.

Apparently, those skilled in the art should know that each of the above-mentioned modules or steps of the present application may be implemented by a general-purpose computing device, the modules or steps may be concentrated on a single computing device or distributed on a network formed by two computing devices, and in some embodiments, the modules or steps may be implemented by program codes executable by the computing devices, so that modules or steps may be stored in a storage device and executed by the computing devices. In some circumstances, the illustrated or described steps may be executed in sequences different from those described herein, or the modules or steps may be made into various integrated circuit modules separately, or two modules or steps therein may be made into a single integrated circuit module for implementation. In this way, the present application is not limited to any specific combination of hardware and software.

What is claimed is:
1. A data transmission method, comprising:
determining time domain resource information of different carrier signals; and
selecting, according to the time domain resource information, one carrier signal from the different carrier signals on each time domain resource to perform the data transmission;
wherein
determining the time domain resource information of the different carrier signals comprises:
determining the time domain resource information of the different carrier signals used for performing the data transmission through configuration information received from a base station, wherein the time domain resource information of the different carrier signals used for performing the data transmission is determined by the base station in a manner of coordination between base stations;
wherein determining the time domain resource information of the different carrier signals used for performing the data transmission comprises at least one of:
determining a time domain resource fixedly used for sending each carrier signal of the different carrier signals in the manner of coordination between the base stations;
determining, according to priorities of sending the different carrier signals on the each time domain resource coordinated between the base stations, the time domain resource information of the different carrier signals used for performing the data transmission;
in response to determining that a plurality of carrier signals need to send data on one time domain resource at the same time, selecting one carrier signal to perform the data transmission on the one time domain resource through a predetermined rule;
determining time domain resources of the different carrier signals used for performing the data transmission through downlink control information; or
determining the time domain resource information of the different carrier signals used for performing the data transmission according to a usage type of the time domain resource coordinated between the base stations; and
wherein determining, according to the priorities of sending the different carrier signals on the each time domain resource coordinated between the base stations, the time domain resource information of the different carrier signals used for performing the data transmission comprises one of:
determining the time domain resource information of the different carrier signals used for performing the data transmission through a manner of determining the priorities of sending the different carrier signals on the time domain resource according to load magnitudes or cached-data magnitudes of the different carrier signals;
determining the time domain resource information of the different carrier signals used for performing the data transmission through a manner of determining, according to transmission information on the time domain resource, the priorities of sending the different carrier signals on the time domain resource; or
determining the time domain resource information the different carrier signals used for performing the data transmission of through a manner of determining, according to conditions of a primary serving cell (Pcell) and a secondary serving cell (Scell), the priorities of sending the different carrier signals on the time domain resource; or
determining the time domain resource information of the different carrier signals used for performing the data transmission comprises:

in response to determining that a subcarrier interval of a carrier signal in which control information for scheduling the data transmission is located is different from a subcarrier interval of a carrier signal for data transmission, or that the subcarrier interval of the carrier signal for the data transmission is different from a subcarrier interval of a corresponding HARQ-ACK feedback corresponding carrier, performing a change of scale according to an instruction of a referenced timing subcarrier interval to determine positions of time domain resources of the different carrier signals used for performing the data transmission.

2. The method of claim 1, wherein selecting the one carrier signal to perform the data transmission on the time domain resource through the predetermined rule comprises at least one of:
   determining, according to link states, path losses, radio resource management (RRM) measurement results, or coverage sizes of the different carrier signals, a carrier signal transmitted on the time domain resource;
   determining, according to load magnitudes or cached-data magnitudes of the different carrier signals, a carrier signal transmitted on the time domain resource;
   determining, according to contents of data to be transmitted on the different carrier signals, a carrier signal transmitted on the time domain resource;
   determining, according to service types of the transmitted data, a carrier signal transmitted on the time domain resource; or
   determining, according to attributes of the different carrier signals, a carrier signal transmitted on the time domain resource.

3. The method of claim 1, wherein in the step of determining the time domain resource information of the different carrier signals used for performing the data transmission according to the usage type of the time domain resource coordinated between the base stations, the usage type of the time domain resource coordinated between the base stations comprises at least one of:
   a first time domain resource: a first carrier signal having a high priority for performing data transmission;
   a second time domain resource: a second carrier signal having a high priority for performing data transmission;
   a third time domain resource: a flexible time domain resource, wherein a carrier signal is selected to perform data transmission through the predetermined rule on the flexible time domain resource;
   a fourth time domain resource: a time domain resource fixedly used for sending the first carrier signal; or
   a fifth time domain resource: a time domain resource fixedly used for sending the second carrier signal.

4. The method of claim 3, wherein the first carrier signal is an LTE carrier signal, and the second carrier signal is an NR carrier signal.

5. The method of claim 1, wherein determining the time domain resource information of the different carrier signals used for performing the data transmission through the configuration information received from the base station comprises:
   determining the time domain resource information of the different carrier signals used for performing the data transmission through higher layer signaling or broadcast information issued from the base station, wherein the higher layer signaling comprises: radio resource control (RRC) signaling, a system information block (SIB) or remaining minimum system information (RMSI).

6. The method of claim 1, wherein the referenced timing subcarrier interval is one of:
   a predefined value, a semi-statically configured value, a subcarrier interval of a carrier signal sending downlink scheduling information, the subcarrier interval of the carrier signal for the data transmission, or a subcarrier interval of a carrier signal indicated by downlink control information.

7. The method of claim 1, wherein the time domain resource comprises at least one of:
   a minimum slot, more than two minimum slots, one slot, more than two slots, one subframe, more than two subframes, one radio frame, more than two radio frames, one unfixed duration, or one fixed duration.

8. The method of claim 7, wherein the time domain resources of the different carrier signals used for performing the data transmission are different.

9. A data transmission method, comprising:
   determining time domain resource information of different carrier signals in a manner of coordination between base stations;
   sending configuration information to a UE, wherein the configuration information is used by the UE for determining the time domain resource information of the different carrier signals, and selecting, according to the time domain resource information, one carrier signal from the different carrier signals to perform the data transmission;
   wherein determining the time domain resource information of the different carrier signals in the manner of coordination between the base stations comprises:
   determining a time domain resource of the different carrier signals fixedly used for sending each carrier signal in the manner of coordination between the base stations;
   coordinating between the base stations, priorities of sending the different carrier signals on each time domain resource;
   indicating, by downlink control information, time domain resources of different carrier signals used for performing data transmission; and
   coordinating between the base stations, a usage type of the time domain resources.

10. The method of claim 9, wherein determining the time domain resource of the different carrier signals fixedly used for sending the each carrier signal in the manner of coordination between the base stations comprises that:
    coordinated usage information of the time domain resource fixedly used for sending the each carrier signal is time domain resource pattern information fixedly used by the each carrier signal.

11. The method of claim 9, wherein coordinating between the base stations, the priorities of sending the different carrier signals on the each time domain resource comprises one of:
    determining the priorities of sending the different carrier signals on the time domain resource according to load magnitudes or cached-data magnitudes of the different carrier signals;
    determining the priorities of sending the different carrier signals on the time domain resource according to transmission information on the time domain resource; and determining the priorities of sending the different carrier signals on the time domain resource according to a condition of a primary serving cell (Pcell) and a secondary serving cell (Scell).

12. The method of claim 9, wherein the usage type of the time domain resource coordinated between the base stations comprises at least one of:
    a first time domain resource: a first carrier signal having a high priority for performing data transmission;
    a second time domain resource: a second carrier signal having a high priority for performing data transmission;
    a third time domain resource: a flexible time domain resource, wherein a carrier signal is selected to perform data transmission through the predetermined rule on the flexible time domain resource;
    a fourth time domain resource: a time domain resource fixedly used for sending the first carrier signal; or
    a fifth time domain resource: a time domain resource fixedly used for sending the second carrier signal; and
    wherein the first carrier signal is an LTE carrier signal, and the second carrier signal is an NR carrier signal.

13. The method of claim 9, further comprising:
    in response to determining that a subcarrier interval of a carrier signal in which control information for scheduling the data transmission is located is different from a subcarrier interval of a carrier signal for data transmission, or that the subcarrier interval of the carrier signal for the data transmission is different from a subcarrier interval of a corresponding HARQ-ACK feedback corresponding carrier, indicating a position of the time domain resource according to a referenced timing subcarrier interval.

14. A data transmission apparatus, comprising: a processor; and a storage medium communicably connected with the processor for storing programs executable by the processor, wherein the programs, when executed by the processor, cause the processor to perform the method of claim 9.

15. A data transmission apparatus, comprising: a processor; and a storage medium communicably connected with the processor for storing programs executable by the processor, wherein the programs, when executed by the processor, cause the processor to perform the following steps:
    determining time domain resource information of different carrier signals; and
    selecting, according to the time domain resource information, one carrier signal from the different carrier signals on each time domain resource to perform the data transmission;
    wherein
    the programs, when executed by the processor, cause the processor to perform determining the time domain resource information of the different carrier signals by:
        determining the time domain resource information of the different carrier signals used for performing the data transmission through configuration information received from a base station, wherein the time domain resource information of the different carrier signals used for performing the data transmission is determined by the base station in a manner of coordination between base stations;
    wherein the programs, when executed by the processor, cause the processor to perform determining the time domain resource information of the different carrier signals used for performing the data transmission by at least one of:
        determining a time domain resource fixedly used for sending each carrier signal of the different carrier signals in the manner of coordination between the base stations;
        determining, according to priorities of sending the different carrier signals on the each time domain resource coordinated between the base stations, the time domain resource information of the different carrier signals used for performing the data transmission;
        in response to determining that a plurality of carrier signals need to send data on one time domain resource at the same time, selecting one carrier signal to perform the data transmission on the one time domain resource through a predetermined rule;
        determining time domain resources of the different carrier signals used for performing the data transmission through downlink control information; or
        determining the time domain resource information of the different carrier signals used for performing the data transmission according to a usage type of the time domain resource coordinated between the base stations; and
    wherein the programs, when executed by the processor, cause the processor to perform determining, according to the priorities of sending the different carrier signals on the each time domain resource coordinated between the base stations, the time domain resource information of the different carrier signals used for performing the data transmission by one of:
        determining the time domain resource information of the different carrier signals used for performing the data transmission through a manner of determining the priorities of sending the different carrier signals on the time domain resource according to load magnitudes or cached-data magnitudes of the different carrier signals;
        determining the time domain resource information of the different carrier signals used for performing the data transmission through a manner of determining, according to transmission information on the time domain resource, the priorities of sending the different carrier signals on the time domain resource; or
        determining the time domain resource information the different carrier signals used for performing the data transmission of through a manner of determining, according to conditions of a primary serving cell (Pcell) and a secondary serving cell (Scell), the priorities of sending the different carrier signals on the time domain resource; or
    the programs, when executed by the processor, cause the processor to perform determining the time domain resource information of the different carrier signals used for performing the data transmission by:
        in response to determining that a subcarrier interval of a carrier signal in which control information for scheduling the data transmission is located is different from a subcarrier interval of a carrier signal for data transmission, or that the subcarrier interval of the carrier signal for the data transmission is different from a subcarrier interval of a corresponding HARQ-ACK feedback corresponding carrier, performing a change of scale according to an instruction of a referenced timing subcarrier interval to determine positions of time domain resources of the different carrier signals used for performing the data transmission.

\* \* \* \* \*